Figure 1:
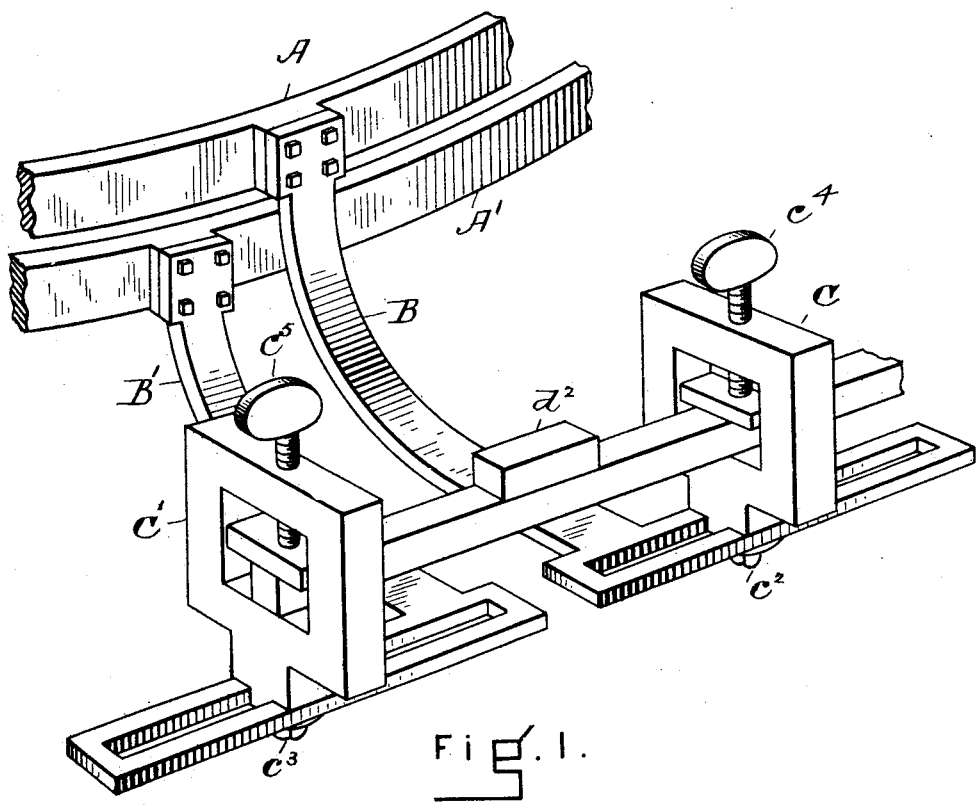

(No Model.) 2 Sheets—Sheet 1.

G. D. BURTON.
METHOD OF ELECTRIC METAL WORKING.

No. 475,183. Patented May 17, 1892.

WITNESSES
INVENTOR
Geo. D. Burton
By F. C. Somes
Attorney (No Model.)  G. D. BURTON.  2 Sheets—Sheet 2.
METHOD OF ELECTRIC METAL WORKING.
No. 475,183.  Patented May 17, 1892.

WITNESSES.

INVENTOR:
Geo. D. Burton
By F. C. Somes,
Attorney.

UNITED STATES PATENT OFFICE.

GEORGE D. BURTON, OF BOSTON, MASSACHUSETTS, ASSIGNOR TO THE ELECTRICAL FORGING COMPANY, OF MAINE.

METHOD OF ELECTRIC METAL-WORKING.

SPECIFICATION forming part of Letters Patent No. 475,183, dated May 17, 1892.

Application filed July 1, 1891. Serial No. 398,189. (No model.)

*To all whom it may concern:*

Be it known that I, GEORGE D. BURTON, of Boston, in the county of Suffolk and State of Massachusetts, have invented a new and useful Improvement in Methods of Heating and Working Metal Bars by Electric Currents, of which the following is a specification.

My invention relates to the heating and working of metal bars by electricity; and it consists in a new and useful mode of conducting the same, substantially as hereinafter described and claimed.

Figure 2:
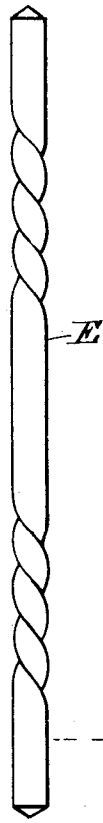
Figure 3:
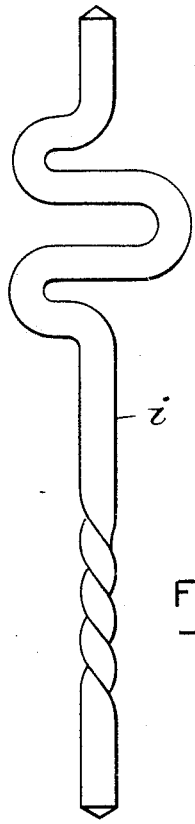
Figure 4:

In the drawings I show certain apparatus for conducting the heating process, as follows:

Figure 1 is a perspective view of the arms and electrodes of the converter with the metal bar in place while being heated. Fig. 2 is a side view of a metal bar after being heated and bent or twisted to form a baluster. Fig. 3 is a side view of another bar heated and bent to a different form. Fig. 4 is a cross-section of the bars shown in Figs. 2 and 3.

A A' are the converter-rings. This converter is connected to any suitable electric dynamo in the usual way, and is so constructed to convert the current of the dynamo of high electro-motive force into a heavy current of low electro-motive force, as is customary in apparatus for heating and welding metals and need not be more specifically described here.

To the rings A A', which are respectively positive and negative members of the heating electric circuit, are attached the arms B B', which carry on their outer ends the slotted plates $b$ $b'$. In the slots of these plates the electrode-clamps $c$ $c'$ are adjusted to the proper distance apart by the set-screws $c^2$ and $c^3$. Each electrode clamps the bar $d$ of metal which is placed in them to be heated and is clamped down by the set-screws $c^4$ and $c^5$ in the frame-work of the clamps. If in this position the current were turned on, the bar would be heated throughout its length between the clamps, starting from within a quarter of an inch inside of each clamp, because the latter is made with bearing-surface enough to prevent heating between the surface of the clamp and bar. It is often more convenient, however, to heat only certain parts of the bar between the clamps which are to be worked or bent, both because the unnecessary heating of the intermediate parts requires more electric current and interferes with the bending or twisting of the parts of the bar after the heating is done. I therefore place upon the center of the bar to be heated, on one side of it, a piece of copper $d^2$ of considerable size, so as to make a good electrical contact with the face of the bar $d$ on which it bears. When the electric current reaches the copper piece $d^2$, it forms an enlarged conductor to carry the electric current over the part of the bar on which it rests without the resistance to the current which it meets in the bar on each side, so that this part of the bar so bridged over does not become heated to the extent of the adjacent parts, and in fact may be kept quite cool while they are raised to the white heat. When the bar has thus been heated, I take it and by a single operation twist it into the form shown in the finished baluster E. (Shown in Fig. 2.) This is done by clamping one end into a vise and applying a wrench to the other end and turning the bar, which causes the heated portion to form the spiral twists, while the cool end and middle portions retain their original shape. If preferred, one of the heated portions may be twisted and the other bent, so as to form the baluster $i$. (Shown in Fig. 5.)

The number of parts of the bar heated may be increased by laying on it a greater number of copper pieces $d^2$ at intervals. It may be found expedient to clamp two pieces $d^2$ on different faces of the same longitudinal part of the bar $d$, so as to afford a larger conductor to carry the electricity over that part of the bar more effectively and prevent its heating; but the method of doing this will be well understood.

What I claim as new and of my invention is—

The method of heating desired portions of a bar of metal spanning the space between electrodes of opposite polarity, which consists in passing a heating-current of electricity through the bar and applying to a portion of the bar between the electrodes while the current is passing therethrough a conductor which diminishes the resistance of the part of the bar which it bridges over and retards or prevents its being heated there, substantially as described.

GEO. D. BURTON.

Witnesses:
CHESTER MARR,
C. A. WEED.